(12) United States Patent
Defrang et al.

(10) Patent No.: US 7,970,801 B1
(45) Date of Patent: *Jun. 28, 2011

(54) DATA PACKAGING SYSTEM AND METHOD

(75) Inventors: Bruce A. Defrang, Batavia, IL (US);
Patrick R. Lee, Bolingbrook, IL (US);
Gregory L. Bodine, Cary, NC (US)

(73) Assignee: Computer Associates Think, Inc.,
Islandia, NY (US)

( * ) Notice: Subject to any disclaimer, the term of this patent is extended or adjusted under 35 U.S.C. 154(b) by 336 days.

This patent is subject to a terminal disclaimer.

(21) Appl. No.: 11/040,146

(22) Filed: Jan. 21, 2005

Related U.S. Application Data

(60) Provisional application No. 60/538,323, filed on Jan. 21, 2004.

(51) Int. Cl.
*G06F 7/00* (2006.01)
(52) U.S. Cl. ...................................... 707/809
(58) Field of Classification Search .................. None
See application file for complete search history.

(56) References Cited

U.S. PATENT DOCUMENTS

| | | | | |
|---|---|---|---|---|
| 4,751,740 A * | 6/1988 | Wright | ........................... | 382/180 |
| 5,119,465 A * | 6/1992 | Jack et al. | ...................... | 717/137 |
| 5,694,598 A * | 12/1997 | Durand et al. | ............ | 707/103 R |
| 5,926,833 A * | 7/1999 | Rasoulian et al. | ........... | 711/147 |
| 6,009,428 A * | 12/1999 | Kleewein et al. | ............... | 707/10 |
| 6,202,099 B1 * | 3/2001 | Gillies et al. | ................... | 719/317 |
| 6,209,124 B1 * | 3/2001 | Vermeire et al. | .............. | 717/114 |
| 6,230,117 B1 * | 5/2001 | Lymer et al. | ..................... | 703/22 |
| 6,331,894 B1 * | 12/2001 | Shimizu | ........................ | 358/1.13 |
| 6,377,953 B1 * | 4/2002 | Gawlick et al. | ............... | 707/102 |
| 6,477,580 B1 * | 11/2002 | Bowman-Amuah | .......... | 709/231 |
| 6,606,660 B1 * | 8/2003 | Bowman-Amuah | .......... | 709/227 |
| 6,615,253 B1 * | 9/2003 | Bowman-Amuah | .......... | 709/219 |
| 6,681,370 B2 * | 1/2004 | Gounares et al. | ............. | 715/238 |
| 6,757,899 B2 * | 6/2004 | Zhdankin et al. | ............. | 719/315 |
| 6,915,304 B2 * | 7/2005 | Krupa | ........................... | 707/102 |
| 6,934,712 B2 * | 8/2005 | Kiernan et al. | ............... | 707/102 |
| 7,046,691 B1 * | 5/2006 | Kadyk et al. | ................... | 370/466 |
| 7,065,588 B2 * | 6/2006 | Konda et al. | ................... | 709/246 |
| 7,831,604 B2 * | 11/2010 | Britton et al. | ................. | 707/755 |
| 2001/0037345 A1 * | 11/2001 | Kiernan et al. | ............... | 707/513 |
| 2002/0156811 A1 * | 10/2002 | Krupa | ........................... | 707/513 |
| 2002/0156872 A1 * | 10/2002 | Brown | ......................... | 709/219 |
| 2003/0028561 A1 * | 2/2003 | Gounares et al. | ............. | 707/513 |
| 2004/0088320 A1 * | 5/2004 | Perry | ......................... | 707/103 R |
| 2004/0123277 A1 * | 6/2004 | Schrader et al. | .............. | 717/143 |
| 2004/0139153 A1 * | 7/2004 | Heidenreich | ................. | 709/203 |
| 2004/0143660 A1 * | 7/2004 | Dimitroff et al. | ............. | 709/224 |
| 2004/0167862 A1 * | 8/2004 | Yabloko | ......................... | 706/55 |

OTHER PUBLICATIONS

"Solaris 8 Internationalized Operating System" article.*
"Solaris 8 Transition Information" article.*

* cited by examiner

*Primary Examiner* — Charles Kim
*Assistant Examiner* — Hubert Cheung
(74) *Attorney, Agent, or Firm* — Pillsbury Winthrop Shaw Pittman LLP

(57) ABSTRACT

A method for communicating data includes selecting a portion of data for communication to a remote computer with the data portion in device-dependent format and comprising at least an integer, a real number, or a binary value. A portable buffer is generated based on the selected data portion, the portable buffer comprising at least one device-independent data representation. The portable buffer is communicated to the remote computer for processing the data portion in a second device-dependent format.

24 Claims, 2 Drawing Sheets

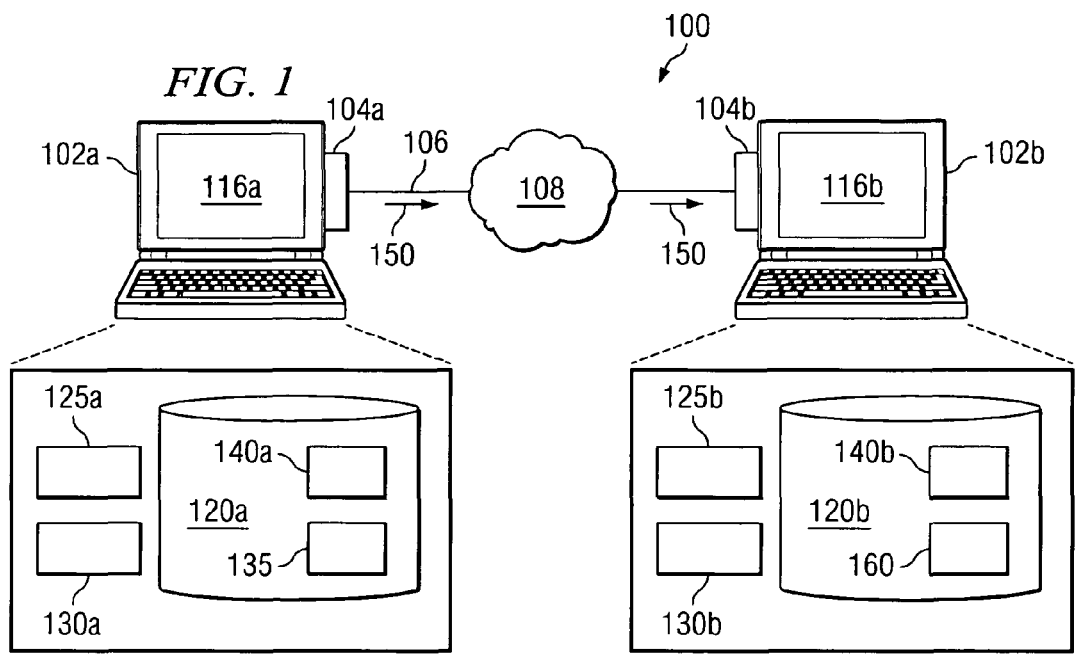
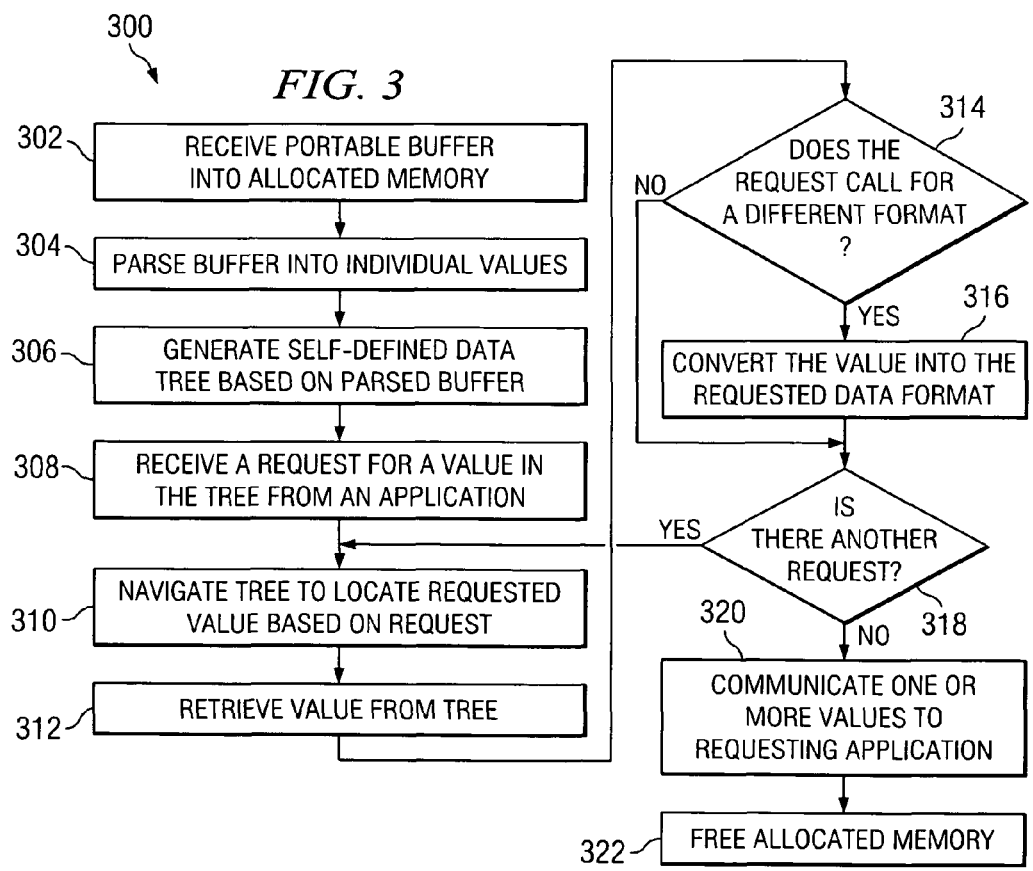

US 7,970,801 B1

DATA PACKAGING SYSTEM AND METHOD

RELATED APPLICATION

This application claims the benefit of U.S. Provisional Patent Application Ser. No. 60/538,323, entitled "Data Packaging System and Method," filed Jan. 21, 2004, the contents of which are hereby incorporated by reference in their entirety.

TECHNICAL FIELD

This disclosure relates generally to the field of data processing and, more particularly, to a data packaging system and method.

BACKGROUND

Many current computing networks may be considered heterogeneous networks, implying that a plurality of disparate computing devices are communicably coupled. These disparate devices often use different encodings of the same data type. For example, an integer value stored on an INTEL®-compliant device is different from the same integer value stored on a device operated by a SUN™ operating system or a device operated by a UNIX™ operating system. Typically, applications residing on the heterogeneous network are responsible for reformatting received data that is in a disparate format. These applications often are customized or redesigned to be operable to reformat the differently encoded data.

SUMMARY

This disclosure provides a data packaging system and method. In one embodiment, the method for communicating data includes selecting a portion of data for communication to a remote computer with the data portion in device-dependent format and comprising at least an integer, a real number, or a binary value. A portable buffer is generated based on the selected data portion, the portable buffer comprising at least one device-independent data representation. The portable buffer is communicated to the remote computer for processing the data portion in a second device-dependent format.

BRIEF DESCRIPTION OF THE DRAWINGS

FIG. 1 illustrates an example system for packaging or communicating data in accordance with one embodiment of the present disclosure;

FIG. 3 is a flowchart illustrating an example method for processing a received portable buffer comprising device-independent data in accordance with one embodiment of the present disclosure.

DESCRIPTION OF EXAMPLE EMBODIMENTS

Figure 2:
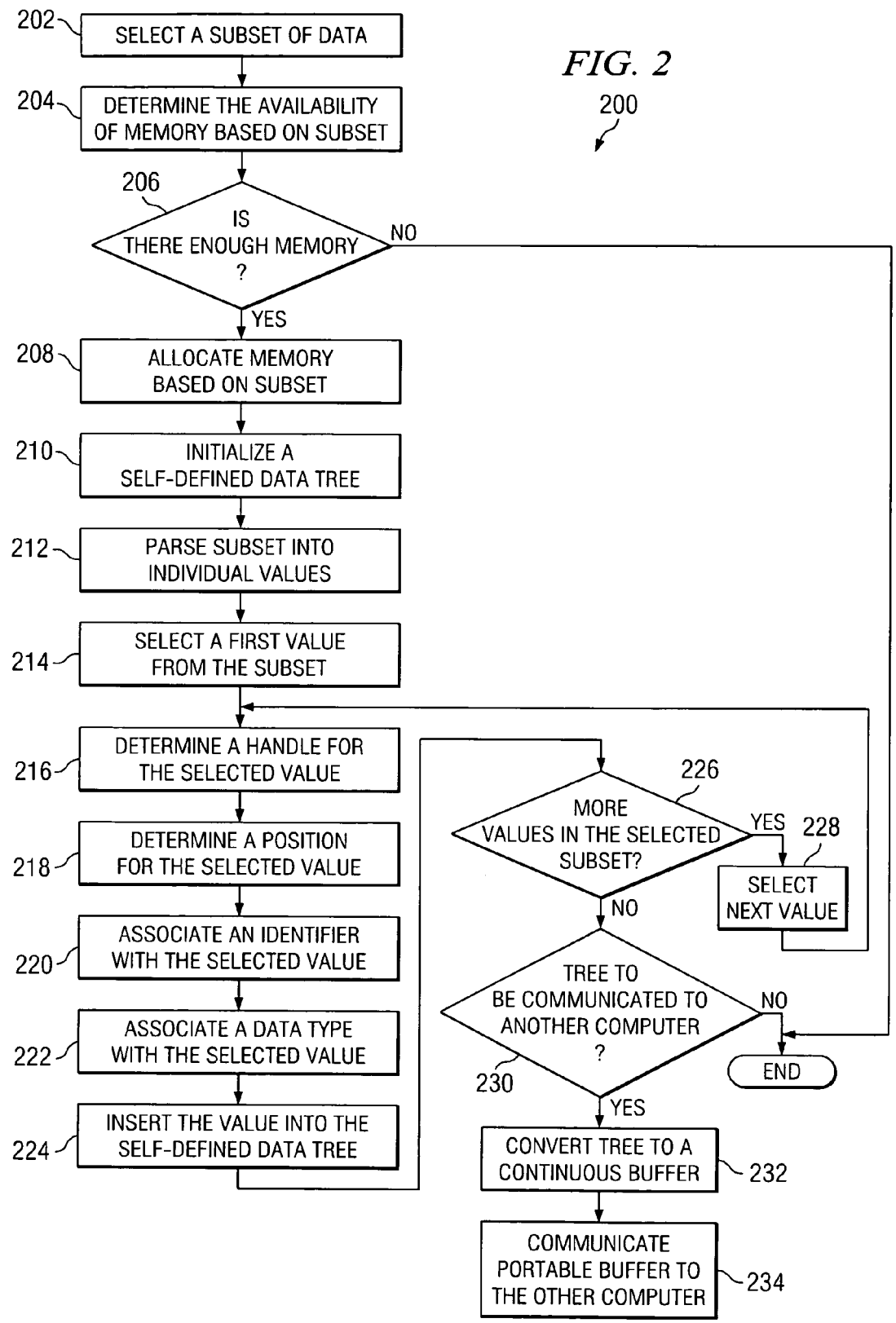
FIG. 2 is a flowchart illustrating an example method for communicating data in accordance with one embodiment of the present disclosure.

FIG. 1 is a block diagram illustrating a networked system 100 for automatically packaging data in a device-independent format according to one embodiment of the present disclosure. In general, the present disclosure contemplates any system 100 that converts stored data into a device-independent format on a first computer 102a, dynamically packages the converted data into a portable buffer 150, and communicates portable buffer 150 from first computer 102a to a second computer 102b for subsequent processing. The term "automatically," as used herein, generally means that the appropriate processing is substantially performed by at least part of system 100. It should be understood that "automatically" further contemplates any suitable user interaction with system 100 without departing from the scope of this disclosure. The term "dynamically," as used herein, generally means that the appropriate processing is determined at least partially at run-time based on one or more variables such as, for example, the operating system or hardware type of second computer 102b. Accordingly, system 100 may comprise a portion of a distributed computing system, two computers 102 remotely located but communicably connected across the Internet, or any other suitable data processing system.

According to the illustrated embodiment, each computer system 102 includes graphical user interface 116, memory 120, processor 125, and an input device such as a keyboard, mouse or touch screen. The illustrated computer 102 also includes self-defined data (SDD) engine 130 and dataset 135 that may be stored in memory 120 and executed or processed by processor 125. At a high level, as used in this document the term "computer" is intended to encompass a personal computer, workstation, server network computer, personal data assistant (PDA), dumb terminal, cell phone, pager, text message device, mainframe, or any other suitable data processing device. In other words, FIG. 1 only illustrates one example of a computer that may be used with the disclosure. Moreover, "computer system 102" and "user of computer 102" may be used interchangeably, as appropriate, without departing from the scope of this disclosure. Computer 102 may execute any operating system including UNIX™, WINDOWS™, LINUX™, and others. The present disclosure contemplates computers other than general purpose computers as well as computers without conventional operating systems. Further, while FIG. 1 illustrates two computers 102, system 100 may include any number of computers 102, including one, without departing from the scope of this disclosure. For example, computers 102a and 102b may represent two processes running separately on an individual computing device.

Computer 102 may include graphical user interface (GUI) 116, which comprises, at least, a graphical user interface operable to allow the user of computer 102 to interact with one or more processes executing on computer 102. Generally, GUI 116 provides the user of computer 102 with an efficient and user-friendly presentation of data provided by computer 102 or network 108. GUI 116 may comprise a plurality of displays having interactive fields, pull-down lists, and buttons operated by the user. In one example, GUI 116 presents an explorer-type interface and receives commands from the user. In another example, GUI 116 comprises a screen on a cell phone operable to present the phone user with data. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in computer 102 and efficiently presents the information to the user. Network 108 can accept data from the user of computer 102 via the web browser (e.g., MICROSOFT® INTERNET EXPLORER® or NETSCAPE NAVIGATOR™) and return the appropriate HTML, JAVA™, or eXtensible Markup Language (XML) responses.

Computer 102 may include an interface 104 for communicating with other computer systems over network 108 such as, for example, in a client-server or other distributed environment via link 106. In one example, SDD engine 130 receives data via network 108 for storage in memory 120. In another example, SDD engine 130 packages a device-independent representation of the data stored in memory into portable buffer 150 and communicates the packaged portable buffer 150 to another computer 102 via network 108. Network 108 facilitates wireless or wireline communication between various components of networked system 100, first computer 102a any other remote computer, and others. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 104 comprises logic encoded in software and/or hardware in a suitable combination and operable to communicate with network 108 via link 106. More specifically, interface 104 may comprise software supporting one or more communications protocols associated with link 106 and communications network 108 hardware operable to communicate physical signals.

Memory 120 may include any memory, hard drive, or database module and may take the form of volatile or non-volatile memory including, without limitation, magnetic media, optical media, random access memory (RAM), read-only memory (ROM), removable media, or any other suitable local or remote memory component. Illustrated memory 120a stores, or includes references to, dataset 135 and self-defined data tree 140. Generally, dataset 135 is device-dependent and includes a plurality of data objects of any appropriate data type, including float, integer, currency, date, Boolean, decimal, string, or any other numeric or non-numeric data type. Each data object is operable to store at least one logical value in the appropriate data type in the device-dependent format. For example, dataset 135 may comprise a relational database described in terms of SQL statements or scripts. Relational databases often use sets of schemas to describe the tables, columns, and relationships in the tables using basic principles known in the field of database design. In another embodiment, dataset 135 may comprise XML documents, flat files, Btrieve files, or comma-separated-value (CSV) files. Memory 120 may include any other suitable data or module or not include the illustrated elements without departing from the scope of this disclosure.

Processor 125 executes instructions and manipulates data to perform the operations of computer 102 and related modules, such as processing by self-defined data engine 130 to create self-defined data tree 140 based on data selected from dataset 135. Although FIG. 1 illustrates a single processor 125 in computer 102, multiple processors 125 may be used and reference to processor 125 is meant to include multiple processors 125 where applicable. Generally, self-defined data (SDD) engine 130 could include any hardware, software, firmware, application program interface (API), logic, or combination thereof operable to access dataset 135, generate self-defined data tree 140 based on the retrieved data, package tree 140 into portable buffer 150, and communicate portable buffer 150 within the scope of this disclosure. In other words, SDD engine 130 is any logical or physical component operable to maintain a list or tree 140 of device-independent values, associate identifiers to go with those values, and bundle tree 140 in portable buffer 150 that can be sent to computer 102b, saved to disk, or otherwise stored or transferred. For example, SDD engine 130 may be written or described in any appropriate computer language including C, C++, JAVA™, VISUAL BASIC®, any suitable version of 4GL (fourth generation programming language), and others. Further, it will be understood that while SDD engine 130 is illustrated as a single multi-tasked module, the features and functionality performed by this module may be performed by multiple local or distributed modules such as, for example, a data retrieval module, a tree generation module, a buffering module, and a communication module. In other words, SDD engine 130 may comprise a first SDD engine 130a and second SDD engine 130b distributed across multiple machine and communicably connected. Moreover, while not illustrated, SDD engine 130 may be a child or sub-module of another module or application without departing from the scope of this disclosure, so long as SDD engine 130 is partially involved in creating self-defined data tree 140 based on dataset 135.

Self-defined data tree 140 comprises a list of values in a device-independent format, organized into a logical hierarchy. Normally, this device-independent format allows for many and/or most, but not necessarily all, computing devices, running any suitable operating system or ASIC, to process the value. This enables disparate devices, executing unique operating systems and storing data in different formats, to easily and reliably communicate and process data. For example, the device-independent format may include UTF-8 string or any other suitable format. Each value in self-defined data tree 140 is often associated with an identifier such as a name, address, or any other characteristic operable to identify the value. Moreover, each value may be associated with a data type such as, for example, integer, float, real, binary, Boolean, character, string, memory address, or any other suitable data type. This allows each value to stored in the device-independent format, such as UTF-8 string, without losing the original data type. For example, self-defined data tree 140 may be a multi-dimensional array of a plurality of UTF-8 strings and associated names and data types. In short, self-defined data tree 140 comprises a device-independent data representation of any number of data objects, retrieved from dataset 135 in any appropriate format.

According to one embodiment, self-defined data tree 140 organizes the device-independent values using a list of entries defined by example SDD_HANDLE and SDD_POSITION variables. SDD_HANDLE is normally used to describe a subset of the entries logically residing at the same level or hierarchy in tree 140. Moreover, each tree 140 may be associated with a list handle, a name, a memory address, or any other appropriate uniquely identifier. Each entry in the list has a different SDD_POSITION.

The topmost SDD_HANDLE is considered the parent handle of this list. According to certain embodiments, each entry in the tree also has a child handle or set of children entries. In the situations where the entry is the lowest logical entry, the child SDD_HANDLE may include no entries. Accordingly, the combination of SDD_HANDLE and SDD_POSITION describes the logical location of one specific entry and, when appropriate, the parent and children of the entry. For example, self-defined data tree 140 may include the following list of example entries representing example data objects:

Id=Oranges
Id=Apples
Id=Red Delicious
   Id=Sweetness, Type=text, Value=TART
   Id=Baking, Type=Boolean, Value=TRUE Id=Macintosh
Id=Jonathan
　　Id=Sweetness, Type=text, Value=TART
　　Id=Baking, Type=Boolean, Value=TRUE
Id=Braeburn
Id=Bananas In the example, the topmost SDD_HANDLE identifies the subset of the logically highest entries including Oranges, Apples, and Bananas. But each subset of entries is identified by a different SDD_POSITION. In other words, while Oranges, Apples, and Bananas share the same SDD_HANDLE value, each is associated with a different SDD_POSITION value. At the next logical level, the entries located in the subset "Apples" include Red Delicious, Macintosh, Jonathan, and Braeburn. Each entry in the "Apples" subset of share one SDD_HANDLE, different from that of the highest logical level, but each is associated with a different SDD_POSITION value. This SDD_HANDLE is the child handle of the entry Apples. It will be understood that this example is for illustration purposes only and self-defined data tree 140 may include and number of data values, in any appropriate format, without departing from the scope of this disclosure.

Portable buffer 150 comprises any data stream that may be communicated to second computer 102b via network 108 or encoded in media for subsequent communication. Generally, buffer 150 is contiguous and portable to other platforms. In other words, buffer 150 comprises at least a communicable version of device-independent tree 140b. According to certain embodiments, SDD engine 130a converts, or packages, self-defined data tree 140a into portable buffer 150 for transport to any other computing device such as computer 102b. Portable buffer 150 may be communicated using IP packets, frames, cells, or any other appropriate data bundle using any communicable protocol. Computer 102b often uses SDD engine 130b to receive portable buffer 150, convert portable buffer 150 into second tree 140b, and communicate the data contained therein to an application 160.

Application 160 comprises any appropriate software module operable to process data stored in tree 140b. Application 160 may be written or described in any appropriate computer language including C, C++, JAVA™, VISUAL BASIC®, any suitable version of 4GL, and others. According to one embodiment, application 160 comprises a C-based software module with one or more APIs to SSD engine 130b. In this embodiment, application 160 may request or retrieve data from tree 140b via SDD engine 130b through the API. For example, tree 140b may comprise data stored in UTF-8 format, while application 160 may process data in Unicode (UTF-16) format. In this example, application 160 requests data from SDD engine 130b, which retrieves the requested data from tree 140b and communicates the data to application 160 in the requested format, in this case Unicode.

According to one aspect of operation, SDD engine 130a retrieves one or more data objects from dataset 135 based on a user request, automatically, or dynamically based on any suitable runtime variable. Next, SDD engine 130a initializes self-defined data tree 140. For example, SDD engine 130a may call an Init( ) function. This example function may be used to begin tree 140 processing. It creates a handle that is used in subsequent calls. According to certain embodiments, Init( ) returns a handle or, if no memory was available, a NULL value. Once the top handle in tree 140 is initialized, SDD engine 130a populates it with the retrieved data objects. This population may include importing another tree 140 into the current tree 140 without departing from the scope of the disclosure via an example ImportFromHandle( ) function utilizing pointers to the various trees 140. In one embodiment, this example function appends the contents to the end of the current tree 140.

SDD engine 130a may also populate self-defined data tree 140 or update or delete entries in self-defined data tree 140 such as, for example, using functions Insert( ), Update( ), and Delete( ). Example function Insert( ) may insert a new entry into tree 140. In one example embodiment, SDD engine 130a generally creates the entry by first determining the value in UTF-8 format, the identifier, the length, and the data type. SDD engine 130 typically converts the current data object into UTF-8 string format. Then, SDD engine 130a specifies the identifier to be given to the entry. It will be understood, however, that identifiers are optional and do not have to be unique. Returning to the example embodiment, SDD engine 130a may provide an identifier using a valid UTF-8 character string. SDD engine 130a may also specify the length of the value to be added to tree 140. This is usually used for binary and character string values. For a binary value, the length indicates the number of bytes of binary data. For a character string, the length would represent the number of characters. SDD engine 130a then specifies the data type of the entry to be added. Data type value include binary, character or string, long integer, short integer, Boolean, float, double, "no value," or any other appropriate data type. SDD engine 130a may further specify where the data is to be logically inserted in tree 140 using position and before/after parameters. The position parameter may have been returned from another function or method or may be set to the value SDD_POSITION_HEAD, to insert at the beginning, or SDD_POSITION_TAIL, to insert at the end. If set to SDD_POSITION_HEAD or SDD_POSITION_TAIL, the exemplary before/after parameter may not be used. This position will typically allow access to this entry, regardless of whether entries are subsequently added or deleted before or after the newly added entry.

Once an entry has been inserted in tree 140, SDD engine 130a may update it using, for example, an Update( ) function. This function may include the same parameters, with different one or more different values, as the Insert( ) that created the entry to be updated. For example, SDD engine 130 may use handle and position parameters to locate the entry, then update the UTF-8 value, change the length, the data type, or the identifier. In another example, SDD engine 130 may use the identifier to update the entry. Entries may also be delete from self-defined data tree 140. For example, SDD engine 130 may use example Delete( ) to locate and remove the requested entry. This example function, typically uses only the location parameters, such as SDD_HANDLE or SDD_POSITION, or the identifier. At any time, SDD engine 130 may navigate tree 140 for various purposes such as, for example, to access or create entries, to export just a portion of the tree, to import another list into the current list, or for any other suitable purpose.

Once SDD engine 130a is substantially finished populating or otherwise processing tree 140, then SDD engine 130a may export tree 140 to portable buffer 150 for communication to computer 102b, another remote data storage device, or another process running on computer 102a. When SDD tree 140 is to be saved on disk, sent across the network or otherwise exported, SDD engine 130 packages the lists into a contiguous buffer. In one embodiment, resulting buffer 150 may comprise all of the data in the form of UTF-8 character strings, saved back to back. Moreover, UTF-8 identifiers describing the data element name, type, and length may also be stored in buffer 150. For example, SDD engine 130 may call example Export function to automatically create portable buffer 150 based, at least in part, tree 140. Once buffer 150 has been created and communicated to computer 102b, SDD engine 130a may free the allocated memory such as, for example, by calling example ExportFree( ) function.

Continuing the example operation, computer 102b receives portable buffer 150 via network 108 and stores buffer 150 in memory 120b. SDD engine 130b then, at any suitable time, imports the contents of buffer 150 into a second self-defined data tree 140b. For example, SDD engine 130b may call example Import( ) function. In this example, Import( ) may cause the contents of buffer 150 to be appended to the end of tree 140b. If the list handle is null, i.e. tree 140b is yet to be created, then a list handle will be created in the process. Once tree 140b is created and substantially populated, SDD engine 130b may retrieve one or more data entries from tree 140b at any appropriate time. For example, SDD engine 130b may automatically retrieve data, dynamically select data based on any appropriate criteria, or use any other suitable selection and retrieval technique such as, for example, using example Get( ) function. This example function retrieves an entry out of SDD tree 140b by specifying which entry via using position and before/after parameters. As above, the position parameter is often used in conjunction with the before/after parameter to specify either the entry to retrieve (e.g., BeforeAfter=SDD_NO_ADVANCE), the entry prior to the entry to retrieve (e.g., BeforeAfter=SDD_AFTER), or the entry following the entry to retrieve (e.g., BeforeAfter=SDD_BEFORE). The example function may also retrieve data via example GetById( ) function, which locates the appropriate data using an identifier associated with the data. Once SDD engine 130b collects the appropriate data, it may communicate the data to application 160, GUI 116, memory 120b, or to any other suitable destination. Once processing of tree 140b is processed by computer 102b, SDD engine 130b may destroy and free a list handle and associated tree 140b via any appropriate technique such as, for example, Destroy( ). It will be understood that the aforementioned example functions and parameters are for illustration purposes only and any appropriate variable or characteristic, function, method, library, module, algorithm, or any other suitable software component may be used without departing from the scope of this disclosure.

FIG. 2 is a flowchart illustrating an example method 200 for communicating data in accordance with one embodiment of the present disclosure. Generally, FIG. 2 describes method 200, which receives or retrieves a data subset, including non-numeric values, from dataset 135, creates a device-independent representation of the data, and communicates the device-independent data to a remote compute using a generated portable buffer 150. The following descriptions focuses on the operation of SDD engine 130 in performing method 200. But system 100 contemplates using any appropriate combination and arrangement of logical elements implementing some or all of the described functionality.

Method 200 begins at step 202, where SDD engine 130a selects or receives a selection of a subset of data from dataset 135 at step 202. It will be understood that the selection may be dynamic, automatic, or in response to a request from a user or anther computing process. Next, SDD engine 130a determines the availability of memory 120 based on the selected subset at step 204. If there is not enough memory at decisional step 206, then processing ends. It will be understood, that alternatively SDD engine 130a may put a request into a queue or round-robin to await free memory 120. Once there is enough memory 120, then SDD engine 130a allocates memory 120 based on the subset at step 208. Next, at step 210, SDD engine 130a initializes a first self-defined data tree 140a. Once data tree 140a is initialized, SDD engine 130a parses the selected subset into individual data objects or values at step 212. Next, in steps 214 through 228, SDD engine 130a populates the initialized data tree 140a based on the parsed data and the associated characteristics.

At step 214, SDD engine 130a selects a first value from this parsed subset. A handle is determined for the selected value, at step 216, as well as a position for the selected value, at step 218. As described earlier, the handle, such as SDD_HANDLE, and the position, such as SDD_POSITION, represent a logical location in tree 140. At step 220, SDD engine 130a associates an optional identifier name with the selected value. SDD engine 130a then associates a data type with the selected value at step 222. The data type may be any value selected from the group including float, long integer, short integer, double, character, string, Boolean, binary, or any other appropriate data type. Once the appropriate characteristics of the selected value have been determined in steps 216 through 222, the value and the appropriate associated characteristics are inserted into self-defined data tree 140a at step 224. This insertion may include any conversion technique operable to convert the values into an appropriate device-independent data format such as, for example, UTF-8. SDD engine 130a then determines if there are more values in the selected subset at decisional step 226. If there are more values, then SDD engine 130a selects the next value at step 228 and processes and returns to step 216. Otherwise, the population of self-defined data tree 140a is considered substantially complete.

According to certain embodiments, SDD engine 130a determines if the populated tree 140a is to be communicated to second computer 102b. For example, SDD engine 130a may automatically communicate tree 140a, communicate tree 140a in response to request from the user of any computing device in system 100, or use any other appropriate determination technique. If tree 140 is not to be communicated to another computer, then processing ends. Otherwise, SDD engine 130a converts or packages tree 140s into continuous portable buffer 150 at step 232. Once portable buffer 150 is generated, computer 102a communicates portable buffer 150 to second computer 102b via network 108 at step 234.

FIG. 3 is a flowchart illustrating an example method 300 for processing a received portable buffer 150, the buffer 150 comprising device-independent data in accordance with one embodiment of the present disclosure. At a high level, method 300 describes an example technique including receiving portable buffer 150 from network 108, creating a self-defined data tree 140, and, when appropriate, converting and communicating the data to application 160 or memory 120 in the appropriate format. The following description will focus on the operation of SDD engine 130b in performing this method. But, as with the previous flowchart, system 100 contemplates using any appropriate combination and arrangement of logical elements implementing some or all of the described functionality.

Method 300 begins when second computer 102b receives portable buffer 150 into allocated memory 120b at step 302. Once received, SDD engine 130b parses buffer 150 into individual values or entries at step 304. Next, at step 306, SDD engine 130b generates or initializes a self-defined data tree 140b based on the parsed buffer. At step 308, SDD engine 130b receives a request for one of the values in tree 140 from an application 160. SDD engine 130b navigates tree 140 to locate the requested value based on the request. For example, the request from application 160 may include a handle in position, an identifier, or any other appropriate parameter operable to locate the requested value or entry. SDD engine 130b retrieves the requested value from tree 140 at step 312.

Next, SDD engine 130b determines if the request called for a different data format at decisional step 314. If it does, then SDD engine 130b converts the value stored in tree 140 into the requested data format such as, for example, Unicode (UTF-16) or multibyte at step 316. Next, or if the request did not call for a different data format, SDD engine 130b determines if there is another request at decisional step 318. If there are more requests, then processing returns to step 310 where the next request is processed similarly to the first request. Once all the requests have been suitably processed at decisional step 318, SDD engine 130b communicates the one or more values to requesting application 160. According to certain embodiments, it will be understood that requesting application 160 may then utilize any appropriate processing without requiring the conversion of one encoding format to another. Finally, at step 322, SDD engine 130b frees any memory 120b allocated based on received portable buffer 150.

The preceding flowcharts and accompanying description illustrate methods 200 and 300 for example purposes only. In short, system 100 contemplates computer 102 using any suitable technique for performing these and other tasks. Accordingly, many of the steps in this flowchart may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for communicating data, comprising:
    receiving a dataset to communicate from a first computing device that executes a first operating system to a second computing device that executes a second operating system, wherein the first operating system encodes one or more data values in the received dataset using a first device-dependent format different from and incompatible with a second device-dependent format that the second operating system uses to encode the one or more data values;
    transforming, at the first computing device, the one or more data values in the received dataset from the first device-dependent format associated with the first operating system into an intermediate device-independent format, wherein the transforming the one or more data values from the first device-dependent format into the intermediate device-independent format includes:
        initializing a data tree that includes a logical hierarchy to organize the one or more data values in the received dataset;
        parsing the received dataset into the one or more data values, wherein the one or more data values in the parsed received dataset are associated with one or more data types; and
        populating the initialized data tree with the one or more data values in the parsed received dataset, wherein the populating the initialized data tree includes:
            determining one or more handles and one or more positions associated with the one or more data values in the parsed received dataset, wherein the one or more determined handles combined with the one or more determined positions represent logical locations that the one or more data values have in the logical hierarchy associated with the initialized data tree;
            associating the one or more data values in the parsed received dataset with one or more identifiers and the one or more data types;
            converting the one or more data values from the first device-dependent format into the intermediate device-independent format; and
            inserting the one or more converted data values, the one or more associated identifiers, and the one or more associated data types into the initialized data tree at the logical locations that the one or more converted data values have in the initialized data tree, thereby populating the initialized data tree; and
    communicating a portable buffer that packages the populated initialized data tree from the first computing device to the second computing device, wherein the second computing device, in response to receiving the communicated portable buffer from the first computing device:
        receives a request to retrieve the one or more converted data values from an application executing on the second operating system;
        retrieves the one or more converted data values from the logical locations that the one or more converted data values have in the populated initialized data tree in response to the received request from the application;
        converts the one or more converted data values retrieved from the populated initialized data tree from the intermediate device-independent format into the second device-dependent format to process the one or more converted data values in response to the received request from the application; and
        communicates the one or more converted data values converted into the second device-dependent format to the application, wherein the application processes the one or more converted data values converted into the second device-dependent format without having to further convert the one or more converted data values to another format.

2. The method of claim 1, wherein the intermediate device-independent format comprises a UTF-8 encoded string format and the one or more converted data values inserted into the initialized data tree have the UTF-8 encoded string format.

3. The method of claim 2, wherein the one or more associated identifiers comprise UTF-8 character string identifiers and the communicated portable buffer comprises the one or more converted data values having the UTF-8 encoded string format and the UTF-8 character string identifiers having the UTF-8 encoded string format.

4. The method of claim 1, further comprising packaging the populated initialized data tree into the portable buffer prior to communicating the portable buffer to the second computing device.

5. The method of claim 4, wherein the portable buffer that packages the populated initialized data tree comprises a contiguous buffer.

6. The method of claim 1, wherein the initializing the data tree that includes the logical hierarchy to organize the one or more data values in the received dataset includes:
    determining whether the first computing device has enough available memory to store the one or more data values in the received dataset;

allocating the memory on the first computing device to initialize the data tree in response to determining that the first computing device has enough available memory to store the one or more data values in the received dataset; and queuing a request to await freed memory on the first computing device in response to determining that the first computing device does not have enough available memory to store the one or more data values in the received dataset, wherein the first computing device allocates the memory to initialize the data tree in response to having enough available or freed memory to store the one or more data values in the received dataset.

7. The method of claim 6, further comprising automatically freeing the memory allocated to the populated initialized data tree on the first computing device in response to communicating the portable buffer that packages the populated initialized data tree to the second computing device.

8. The method of claim 1, wherein the second computing device, in response to receiving the communicated portable buffer from the first computing device, further:

determines one or more parameters that the application includes in the request to identify the logical locations that the one or more converted data values have in the populated initialized data tree; and navigates to the identified logical locations that the one or more converted data values have in the populated initialized data tree with the one or more determined parameters included in the request to retrieve the one or more converted data values from the logical locations that the one or more converted data values have in the populated initialized data tree.

9. A non-transitory computer readable storage medium having one or more computer-executable instructions stored thereon which when executed by one or more processors cause the one or more processors to:

receive a dataset to communicate from a first computing device that executes a first operating system to a second computing device that executes a second operating system, wherein the first operating system encodes one or more data values in the received dataset using a first device-dependent format different from and incompatible with a second device-dependent format that the second operating system uses to encode the one or more data values;

transform, at the first computing device, the one or more data values in the received dataset from the first device-dependent format associated with the first operating system into an intermediate device-independent format, wherein the one or more computer-executable instructions that cause the one or more processors to transform the one or more data values from the first device-dependent format into the intermediate device-independent format further cause the one or more processors to:

initialize a data tree that includes a logical hierarchy to organize the one or more data values in the received dataset;

parse the received dataset into the one or more data values, wherein the one or more data values in the parsed received dataset are associated with one or more data types; and populate the initialized data tree with the one or more data values in the parsed received dataset, wherein the one or more computer-executable instructions that cause the one or more processors to populate the initialized data tree with the one or more data values further cause the one or more processors to:

determine one or more handles and one or more positions associated with the one or more data values in the parsed received dataset, wherein the one or more determined handles combined with the one or more determined positions represent logical locations that the one or more data values have in the logical hierarchy associated with the initialized data tree;

associate the one or more data values in the parsed received dataset with one or more identifiers and the one or more data types;

convert the one or more data values from the first device-dependent format into the intermediate device-independent format; and insert the one or more converted data values, the one or more associated identifiers, and the one or more associated data types into the initialized data tree at the logical locations that the one or more converted data values have in the initialized data tree, thereby populating the initialized data tree; and communicate a portable buffer that packages the populated initialized data tree from the first computing device to the second computing device, wherein the second computing device, in response to receiving the communicated portable buffer from the first computing device:

receives a request to retrieve the one or more data values from an application executing on the second operating system;

retrieves the one or more converted data values from the logical locations that the one or more converted data values have in the populated initialized data tree in response to the received request from the application;

converts the one or more converted data values retrieved from the populated initialized data tree from the intermediate device-independent format into the second device-dependent format to process the one or more converted data values in response to the received request from the application; and communicates the one or more converted data values converted into the second device-dependent format to the application, wherein the application processes the one or more converted data values converted into the second device-dependent format without having to further convert the one or more converted data values to another format.

10. The non-transitory computer readable storage medium of claim 9, wherein the intermediate device-independent format comprises a UTF-8 encoded string format and the one or more converted data values inserted into the initialized data tree have the UTF-8 encoded string format.

11. The non-transitory computer readable storage medium of claim 10, wherein the one or more associated identifiers comprise UTF-8 character string identifiers and the communicated portable buffer comprises the one or more converted data values having the UTF-8 encoded string format and the UTF-8 character string identifiers having the UTF-8 encoded string format.

12. The non-transitory computer readable storage medium of claim 9, wherein the one or more computer-executable instructions further cause the one or more processors to package the populated initialized data tree into the portable buffer prior to communicating the portable buffer to the second computing device.

13. The non-transitory computer readable storage medium of claim 12, wherein the portable buffer that packages the populated initialized data tree comprises a contiguous buffer.

14. The non-transitory computer readable storage medium of claim 9, wherein the one or more computer-executable instructions that cause the one or more processors to initialize the data tree further cause the one or more processors to:
  determine whether the first computing device has enough available memory to store the one or more data values in the received dataset;
  allocate the memory on the first computing device to initialize the data tree in response to determining that the first computing device has enough available memory to store the one or more data values in the received dataset; and
  queue a request to await freed memory on the first computing device in response to determining that the first computing device does not have enough available memory to store the one or more data values in the received dataset, wherein the one or more processors allocate the memory to initialize the data tree in response to the first computing device having enough available or freed memory to store the one or more data values in the received dataset.

15. The non-transitory computer readable storage medium of claim 14, wherein the one or more computer-executable instructions further cause the one or more processors to automatically free the memory allocated to the populated initialized data tree on the first computing device in response to communicating the portable buffer that packages the populated initialized data tree to the second computing device.

16. The non-transitory computer readable storage medium of claim 9, wherein the second computing device, in response to receiving the communicated portable buffer from the first computing device, further:
  determines one or more parameters that the application includes in the request to identify the logical locations that the one or more converted data values have in the populated initialized data tree; and
  navigates to the identified logical locations that the one or more converted data values have in the populated initialized data tree with the one or more determined parameters included in the request to retrieve the one or more converted data values from the logical locations that the one or more converted data values have in the populated initialized data tree.

17. A system for communicating data, comprising:
  a first computing device configured to execute a first operating system that encodes data using a first device-dependent format;
  a second computing device configured to execute a second operating system that encodes data using a second device-dependent format different from and incompatible with the first device-dependent format;
  one or more processors configured to:
    receive a dataset to communicate from the second computing device to the first computing device, wherein the received dataset includes one or more data values encoded in the second device-dependent format associated with the second operating system;
    transform, at the second computing device, the one or more data values in the received dataset from the second device-dependent format associated with the second operating system into an intermediate device-independent format, wherein to transform the one or more data values into the intermediate device-independent format, the one or more processors are further configured to:
      initialize a data tree that includes a logical hierarchy to organize the one or more data values in the received dataset;
      parse the received dataset into the one or more data values, wherein the one or more data values in the parsed received dataset are associated with one or more data types; and
      populate the initialized data tree with the one or more data values in the parsed received dataset, wherein to populate the initialized data tree, the one or more processors are further configured to:
        determine one or more handles and one or more positions associated with the one or more data values in the parsed received dataset, wherein the one or more determined handles combined with the one or more determined positions represent logical locations that the one or more data values have in the logical hierarchy associated with the initialized data tree;
        associate the one or more data values in the parsed received dataset with one or more identifiers and the one or more data types;
        convert the one or more data values from the second device-dependent format to the intermediate device-independent format; and
        insert the one or more converted data values, the one or more associated identifiers, and the one or more associated data types into the initialized data tree at the logical locations that the one or more converted data values have in the initialized data tree, thereby populating the initialized data tree; and
    communicate a portable buffer that packages the populated initialized data tree from the second computing device to the first computing device, wherein the first computing device, in response to receiving the communicated portable buffer from the second computing device, is further configured to:
      receive a request to retrieve the one or more converted data values in the populated initialized data tree from an application executing on the first operating system;
      retrieve the one or more converted data values from the logical locations that the one or more converted data values have in the populated initialized data tree in response to the received request from the application;
      convert the one or more converted data values retrieved from the populated initialized data tree from the intermediate device-independent format into the first device-dependent format to process the one or more converted data values in response to the received request from the application; and
      communicate the one or more converted data values converted into the first device-dependent format to the application, wherein the application processes the one or more converted data values converted into the first device-dependent format without having to further convert the one or more converted data values to another format.

18. The system of claim 17, wherein the intermediate device-independent format comprises a UTF-8 encoded string format and the one or more converted data values inserted into the initialized data tree have the UTF-8 encoded string format.

19. The system of claim 18, wherein the one or more associated identifiers comprise UTF-8 character string identifiers and the communicated portable buffer comprises the one or more converted data values having the UTF-8 encoded string format and the UTF-8 character string identifiers values having the UTF-8 encoded string format.

20. The system of claim 17, wherein the one or more processors are further configured to package the populated initialized data tree into the portable buffer prior to communicating the portable buffer to the first computing device.

21. The system of claim 20, wherein the portable buffer that packages the populated initialized data tree comprises a contiguous buffer.

22. The system of claim 17, wherein to initialize the data tree, the one or more processors are further configured to:
   determine whether the second computing device has enough available memory at to store the one or more data values in the received dataset;
   allocate the memory on the second computing device to initialize the data tree in response to determining that the second computing device has enough available memory to store the one or more data values in the received dataset; and
   queue a request to await freed memory on the second computing device in response to determining that the second computing device does not have enough available memory to store the one or more data values in the received dataset, wherein the one or more processors allocate the memory to initialize the data tree in response to the second computing device having enough available or freed memory to store the one or more data values in the received dataset.

23. The system of claim 22, wherein the one or more processors are further configured to automatically free the memory allocated to the populated initialized data tree on the second computing device in response to communicating the portable buffer that packages the populated initialized data tree to the first computing device.

24. The system of claim 17, wherein the first computing device, in response to receiving the communicated portable buffer from the second computing device, is further configured to:
   determine one or more parameters that the application includes in the request to identify the logical locations that the one or more converted data values have in the populated initialized data tree; and
   navigate to the identified logical locations that the one or more converted data values have in the populated initialized data tree with the one or more determined parameters included in the request to retrieve the one or more converted data values from the logical locations that the one or more converted data values have in the populated initialized data tree.

* * * * *